United States Patent
Jackson et al.

(10) Patent No.: US 8,406,939 B2
(45) Date of Patent: Mar. 26, 2013

(54) SYSTEMS AND METHODS FOR RTA CONTROL OF MULTI-SEGMENT FLIGHT PLANS WITH SMOOTH TRANSITIONS

(75) Inventors: Mike Jackson, Maple Grove, MN (US); Michal Polansky, South Moravia (CZ); Erwan Paricaud, Haute Garonne (FR); Jiri Svoboda, Novy Jicin (CZ)

(73) Assignee: Honeywell International Inc., Morristown, NJ (US)

( * ) Notice: Subject to any disclaimer, the term of this patent is extended or adjusted under 35 U.S.C. 154(b) by 185 days.

(21) Appl. No.: 12/875,371

(22) Filed: Sep. 3, 2010

(65) Prior Publication Data

US 2012/0059535 A1 Mar. 8, 2012

(51) Int. Cl.
G06F 7/00 (2006.01)
(52) U.S. Cl. .......... 701/3; 701/301; 701/120; 701/121; 701/528; 701/465
(58) Field of Classification Search .......... 701/120, 701/121, 123, 301, 465, 467, 528, 533
See application file for complete search history.

(56) References Cited

U.S. PATENT DOCUMENTS

| | | | |
|---|---|---|---|
| 4,232,839 A | 11/1980 | Sicre et al. | |
| 4,825,374 A | 4/1989 | King et al. | |
| 5,121,325 A * | 6/1992 | DeJonge | 701/123 |
| 5,408,413 A | 4/1995 | Gonser et al. | |
| 5,457,634 A * | 10/1995 | Chakravarty | 701/3 |
| 6,061,612 A * | 5/2000 | Sainthuile et al. | 701/7 |
| 6,266,610 B1 * | 7/2001 | Schultz et al. | 701/528 |
| 6,507,782 B1 * | 1/2003 | Rumbo et al. | 701/121 |
| 6,604,044 B1 * | 8/2003 | Kirk | 701/120 |
| 6,690,296 B2 * | 2/2004 | Corwin et al. | 340/961 |
| 7,248,963 B2 * | 7/2007 | Baiada et al. | 701/120 |
| 7,366,591 B2 * | 4/2008 | Hartmann et al. | 701/4 |
| 7,797,102 B2 * | 9/2010 | Fortier | 701/467 |
| 7,818,118 B2 * | 10/2010 | Ivansson et al. | 701/465 |
| 7,904,213 B2 * | 3/2011 | Coulmeau | 701/3 |
| 2003/0004641 A1 * | 1/2003 | Corwin et al. | 701/301 |
| 2003/0093219 A1 * | 5/2003 | Schultz et al. | 701/202 |

(Continued)

OTHER PUBLICATIONS

Jackson, M.R.C., CDA with RTA in a Mixed Environment, 978-1-4244-4078-8/09, 2009 IEEE.

(Continued)

Primary Examiner — Thomas Black
Assistant Examiner — Wae Louie
(74) Attorney, Agent, or Firm — Ingrassia Fisher & Lorenz, P.C.

(57) ABSTRACT

Methods, systems and device are provided for smoothing a required time of arrival (RTA) speed transition for an aircraft in a multi-segmented speed profile including at least one preceding region with a first predetermined speed pad and at a speed constrained region with a second predetermined speed pad. Exemplary methods include, but are not limited to determining whether a speed constrained region is engaged by a preceding region based at least in part on a speed of an aircraft. If the speed constrained region is engaged, the instructions determine a revised second speed pad for the speed constrained region. If the speed constrained region is not engaged then the instructions assign a default speed pad as the second speed pad for the speed constrained region. The instructions also compile a new speed profile that is defined by one of the revised second speed pad and the default speed pad for the speed constrained region and transmit commands that accelerate the aircraft to a new speed based on the new speed profile.

20 Claims, 7 Drawing Sheets

U.S. PATENT DOCUMENTS

| | | | |
|---|---|---|---|
| 2005/0283281 A1* | 12/2005 | Hartmann et al. | 701/4 |
| 2008/0103646 A1 | 5/2008 | Lucas et al. | |
| 2008/0300738 A1* | 12/2008 | Coulmeau et al. | 701/3 |
| 2009/0259351 A1* | 10/2009 | Wachenheim et al. | 701/7 |
| 2009/0259392 A1* | 10/2009 | Berard et al. | 701/121 |
| 2010/0131125 A1* | 5/2010 | Blanchon et al. | 701/3 |
| 2011/0118908 A1* | 5/2011 | Boorman et al. | 701/14 |
| 2011/0137493 A1* | 6/2011 | Dacre-Wright et al. | 701/3 |
| 2011/0270470 A1* | 11/2011 | Svoboda et al. | 701/3 |
| 2012/0035841 A1* | 2/2012 | Polansky et al. | 701/120 |
| 2012/0059535 A1* | 3/2012 | Jackson et al. | 701/3 |

OTHER PUBLICATIONS

EP Search Report, EP 11 178 737.0 dated Jan. 13, 2012.
EP Examination Report, EP 11 178 737.0 dated Jan. 26, 2012.
EP Communication for EP 11178737.0-2206 dated Dec. 20, 2012.
EP Examination Report for EP 11 178 737.0 dated Aug. 10, 2012.

* cited by examiner

SYSTEMS AND METHODS FOR RTA CONTROL OF MULTI-SEGMENT FLIGHT PLANS WITH SMOOTH TRANSITIONS

TECHNICAL FIELD

The present invention generally relates to flight crew interfaces, and more particularly relates to systems and methods for smoothing a required time of arrival ("RTA") speed transition.

BACKGROUND

The ever increasing amount of air traffic has caused a marked increased in the workload of air traffic control ("ATC") controllers in high traffic density areas around airports. The Next Generation (NextGen) overhaul of the United States airspace system and the companion Single European Sky ATM Research (SESAR) overhaul of the European airspace system are proposing various trajectory-based mechanisms to ease the pressures on the air traffic management. Some solutions being suggested include the increased use of onboard Required Time of Arrival ("RTA") systems that allow an aircrew limited control of aircraft spacing and separation in areas where ATC personnel may face heavy work loads.

These RTA systems may also be used to control speed transitions in multi-segment flight plans. Flight plans are developed in segments between "waypoints" or points in space defined by latitude, longitude, an altitude. These segments have physical or regulatory maximum and minimum airspeed constraints. Further, one or more waypoints in the flight plan may have a required time of arrival ("RTA") assigned to those waypoints which may be a specific arrival time (i.e. a "hard RTA") or may be a one sided restriction such as arriving "no earlier than" or "no later than" a specific time. The principles described herein are applicable to flight plan scenarios comprising multiple speed segments to a waypoint with an RTA, or between two waypoints with hard RTA's where passing the first hard RTA commences the scenario.

However, there are uncertainties involved in traversing an RTA generated flight plan trajectory. These uncertainties may include ATC restrictions/clearances, wind changes and unexpected weather, among others. Therefore, when developing a flight plan, flight planners avoid altitudes and speeds that approach regulatory, operational or physical airframe limitations, particularly when approaching an RTA waypoint. It is prudent to operate an aircraft in a way that permits ample maneuvering flexibility so that the RTA can be met. Hence, flight planners build in adequate leeway or "pad" their flight plans such that an aircraft has reasonable room to accelerate/decelerate or to climb/descend if the need or opportunity arises. This may be done by building in air speeds that are materially lower than either the maximum recommended speed tolerance of the airframe/engines or below the ATC imposed speed limits, whichever is lower. The difference between the planned air speed and the maximum (or minimum) allowable air speed in a segment of a flight plan will be referred to herein below as the segment control margin or the "pad" of the segment.

Flight planners are particularly concerned about conserving the pad of later and/or speed constrained flight plan regions particularly when these regions immediately precede a RTA waypoint with its specified time requirements. Planners want to have some speed maneuverability as the RTA waypoint is approached so that the RTA can be met smoothly without excessively changing speed.

Similarly, the region immediately preceding an RTA waypoint may become physically constrained due to the physically impossibility of meeting an RTA if the aircraft falls too far behind schedule. Flight planners want to conserve the pad in a speed constrained region should it become necessary to accelerate while traversing speed constrained segments to meet an RTA and not violate speed constraints.

If the aircraft does fall behind the flight plan in a particular region, the aircraft may increase speed (e.g., consume the pad) in its current segment until the aircraft is again able to meet the RTA at the waypoint of concern by adhering to the remainder of the flight plan. It may or may not be possible to increase speed sufficiently in the aircraft's current segment to meet the RTA. In any event, it is also fuel inefficient to accelerate from a planned air speed in one segment to reach a waypoint on time to then slow back down to a planned air speed of the next segment when the aircraft enters the next segment just to again accelerate when the aircraft falls behind the RTA because the flight uncertainties persist.

Accordingly, it is desirable to develop a system and method to compensate for experience flight uncertainties while traversing earlier flight segments. In addition, it is desirable to adjust the aircraft speed profile in multiple segments simultaneously. Furthermore, other desirable features and characteristics of the present invention will become apparent from the subsequent detailed description of the invention and the appended claims, taken in conjunction with the accompanying drawings and this background of the invention.

BRIEF SUMMARY

A method is provided for creating a smooth speed profile while meeting a required time of arrival (RTA) for an aircraft in a multi-segmented flight plan including a preceding region with a first predetermined speed pad and a speed constrained region with a second predetermined speed pad. The method comprises determining whether the speed constrained region is engaged based at least in part on a proximity to the speed constrained region. If the speed constrained region is engaged, then a revised second speed pad for the speed constrained region is determined. If the speed constrained region is not engaged then a default speed pad is assigned as the second speed pad for the speed constrained region. The method also comprises compiling a new speed profile that is defined by one of the revised second speed pad and the default speed pad for the speed constrained region and accelerating the aircraft to a new speed based on the new speed profile and causing the aircraft speed to be in conformance with the new speed profile.

A device is provided for smoothing a required time of arrival (RTA) speed transition for an aircraft in a multi-segmented speed profile. The device comprises a means for determining whether the speed constrained region is engaged based at least in part on the new aircraft speed, a means for determining a revised second speed pad for the speed constrained region if the speed constrained region is engaged and a means for assigning a default speed pad as the second speed pad for the speed constrained region if the speed constrained region is not engaged. The device also comprises a means for compiling a new speed profile that is defined by one of the revised second speed pad and the default speed pad for the speed constrained region and a means for causing the aircraft to comply with the new speed profile.

A computer readable storage medium ("CRM") is provided for containing instructions that when executed by a computing device determines whether a speed constrained region is engaged by a preceding region based at least in part on a speed of an aircraft. If the speed constrained region is engaged, the instructions determine a revised second speed pad for the speed constrained region. If the speed constrained region is not engaged then the instructions assign a default speed pad as the second speed pad for the speed constrained region. The instructions also compile a new speed profile that is defined by one of the revised second speed pad and the default speed pad for the speed constrained region and transmit commands that cause the aircraft to conform to the new speed profile.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
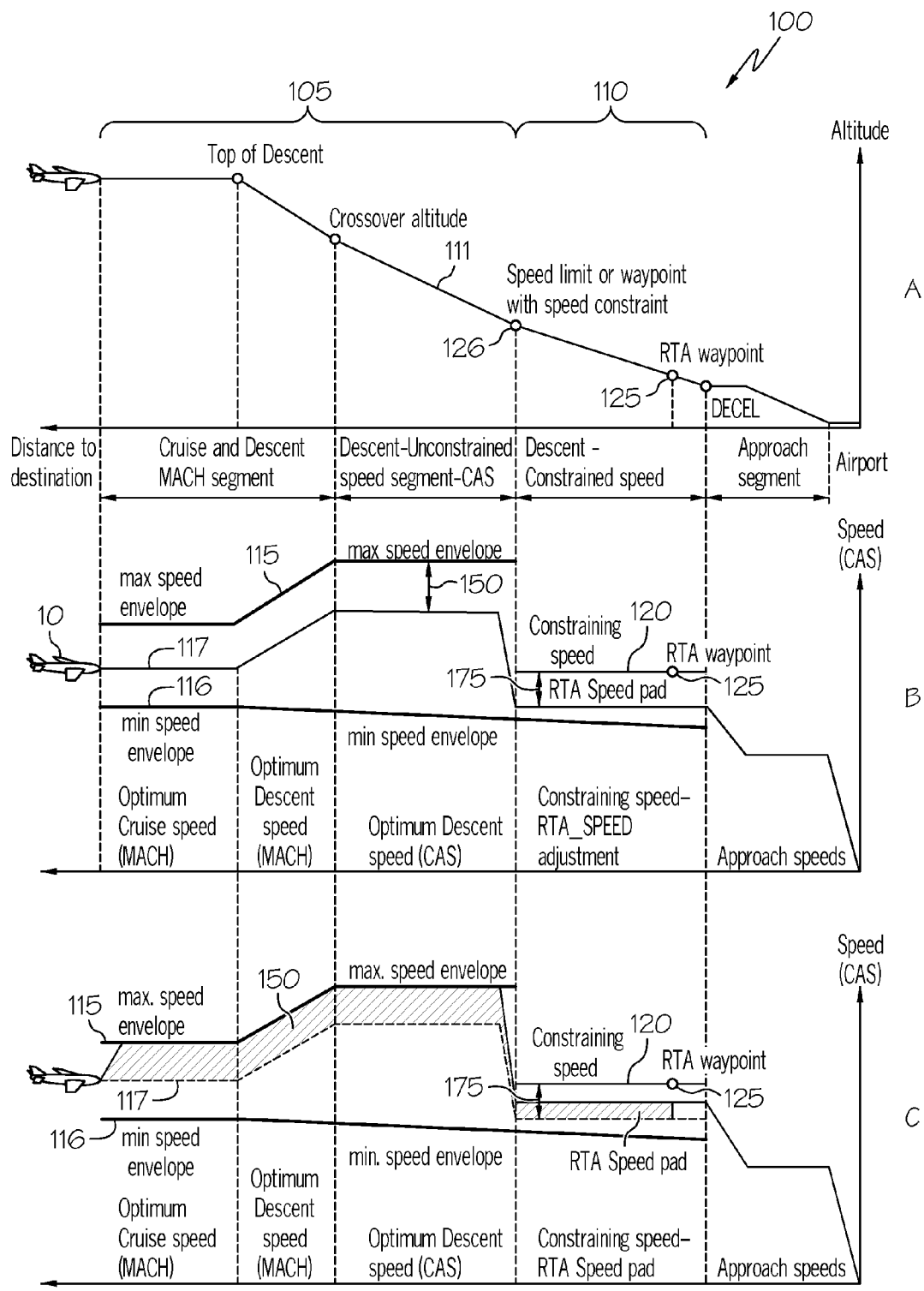
FIG. 1 is an illustration of the descent phase of an exemplary flight plan where the aircraft is behind schedule and the speed pad of the preceding region is saturated

FIG. 1 is a graphical depiction of the descent phase of an exemplary flight plan 100. Although the systems and methods disclosed herein generally apply to other phases of the flight plan 100, an exemplary descent phase has been chosen in the interest of brevity and clarity. The exemplary descent phase of FIG. 1 has been broken down into various exemplary segments including Cruise and Descent, Descent-unconstrained, Descent-Constrained, and Approach. For ease of explanation, these segments have been combined into a speed constrained region 110 and all other preceding regions (together, the "preceding region") 105. The speed constrained region 110 may be governed by a regulatory speed limit. For example at altitudes below 10,000 feet, the speed of an aircraft 10 may be limited to 250 knots due to noise concerns in residential neighborhoods.

FIG. 1 has been drawn to present three different aspect profiles of the flight plan 100. Profile "A" is an altitude profile 111 of the flight plan 100 and contains an exemplary hard RTA waypoint 125. Profile "B" is a planned speed profile showing a maximum speed envelope 115, a minimum speed envelope 116 and the planned speed envelope 117. The maximum speed envelope 115 may be the maximum rated operational speed of the aircraft 10 at a particular altitude. The minimum speed envelope may be the stall speed of the aircraft 10. The difference between planned speed envelope 117 and the constrained speed limit is the "pad" 150 of the preceding region 105. In the speed constrained region 110, profile B also indicates the constrained speed limit 120. The difference between planned speed envelope 117 and the constrained speed limit is the "pad" 175 of the speed constrained region 110.

Profile "C" illustrates a dynamic that may occur in response to the aircraft 10 being behind schedule using embodiments disclosed herein. Profile "C" depicts the speed pad 150,175 for each region in the flight plan 100. In the interest of clarity and brevity, the pad 175 for the constrained speed region 110 will be assumed to be 10 knots with a constraining speed limit 120 of 250 knots, although those of ordinary skill in the art will appreciate that constraining speed limit and pad 175 may be any value depending on locale and aircraft operator.

In the example of profile "C", the crosshatching indicates that aircraft is behind schedule and has already increased speed to the maximum speed envelope in an attempt to reach the RTA waypoint 125 on time. However, the increase in speed in the preceding region 105 alone will be insufficient. As such, an exemplary RTA system 200 (see FIG. 3) "taps into" or "engages" the pad 175 of the speed constrained region 110 by increasing the planned speed 117 in the speed constrained region 110 thereby reducing the pad 175. For example the pad 175 may be decreased from 10 knots to 5 knots as the speed is increased 5 knots should the system 200 be configured with a unity gain in this respect. Because the aircraft may now fly 5 knots faster than planned in the speed constrained 110, the aircraft may now reach the RTA waypoint 125 on time and not violate the speed constraints in either region.

Figure 2:
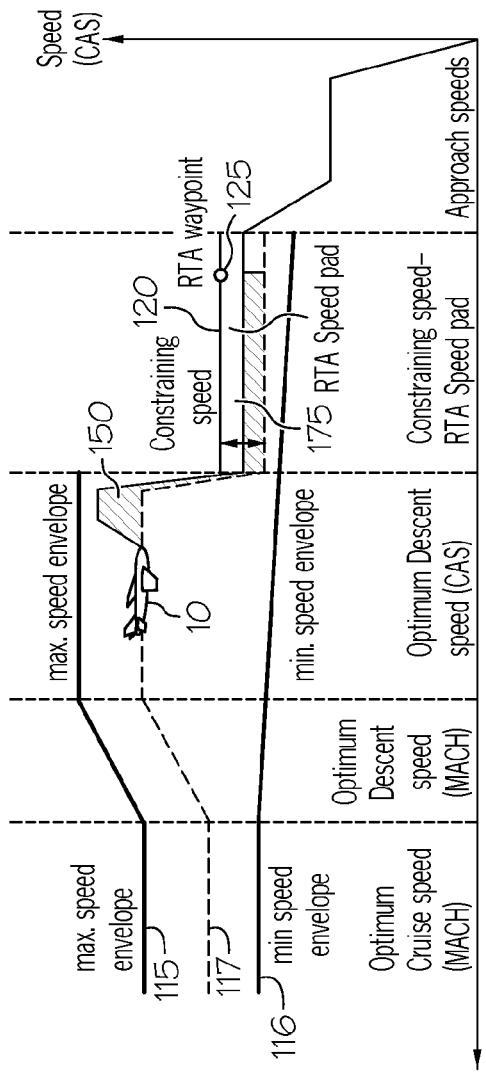
FIG. 2 is profile "C" of FIG. 1, advanced in time, where the speed pad of the constrained region is engaged due to aircraft proximity to the speed constrained region.

FIG. 2 is speed profile "C" of FIG. 1 advanced in time and illustrates another embodiment using the exemplary methods describe herein. In FIG. 2, the aircraft 10 has traveled most of the preceding region(s) 105 but finds itself behind schedule as it is approaching the speed constrained region 110. In order to meet the RTA at RTA waypoint 125, the aircraft 10 could accelerate to a higher speed in the preceding region 105. However, this close to the end of the preceding segment, the speed change would have to be drastic to correct the time error. As a further solution, the planned speed 117 that was intended to be used in the speed constrained region 110 may also be increased, thereby decreasing the pad 175 of the speed constrained region 110 accordingly. In this exemplary case the engagement of the pad 175 in the speed constrained region 110 is triggered by proximity to the speed constrained region instead of the saturation (i.e. traveling at maximum speed) of the speed pad 150 of the preceding region, discussed above.

Figure 3:
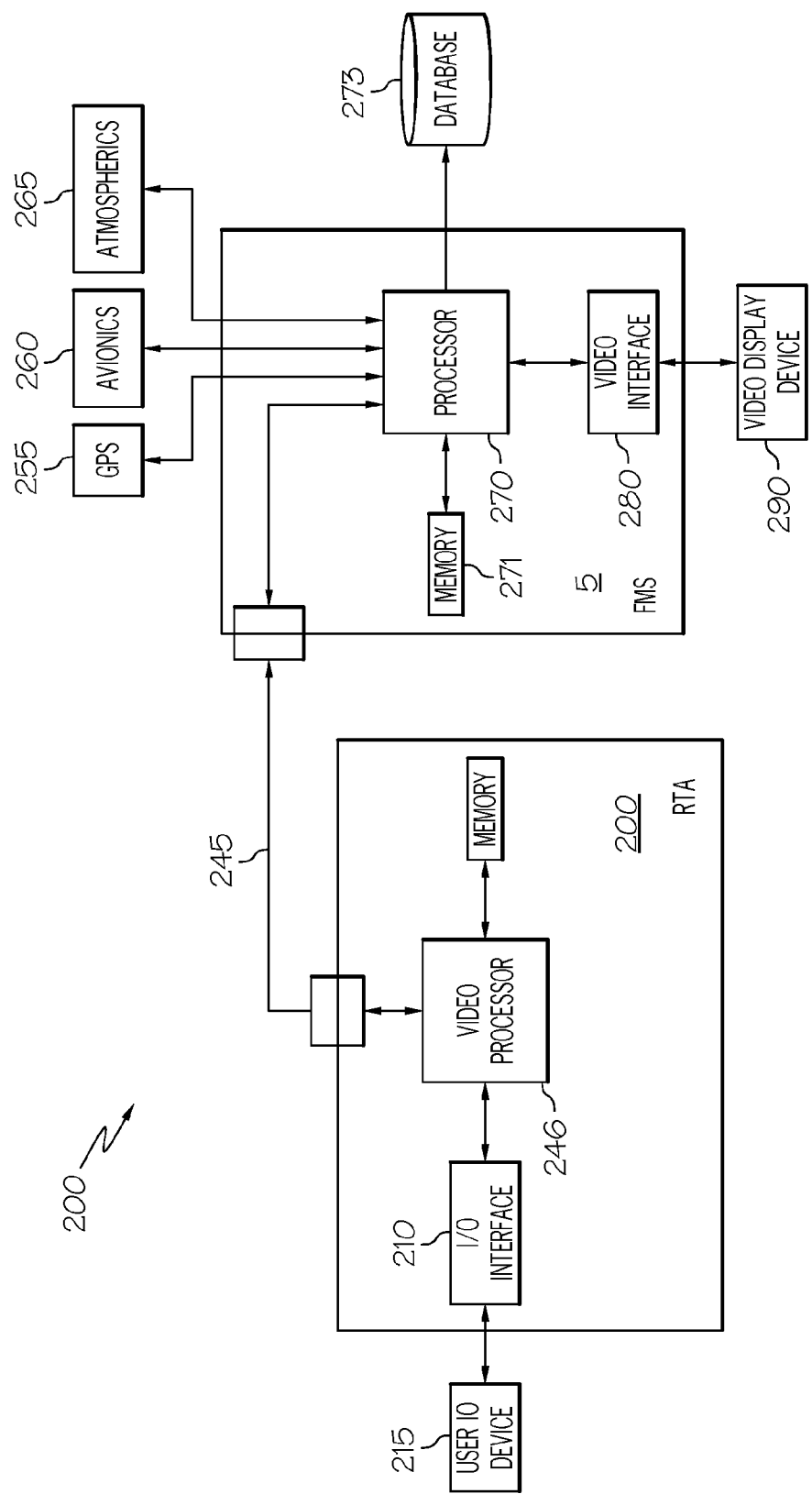
FIG. 3 an illustration of a simplified architecture supporting exemplary embodiments disclosed herein.

FIG. 3 is a simplified, exemplary architecture illustrating the components of a system 200 that may be used to execute the smoothing of an RTA speed transition across multiple flight path regions and may comprise at least a Flight Management System ("FMS") or similar system. The system 200 may include an FMS 5, an RTA system 202 and an autopilot 250. The FMS 5, the RTA system 202 and the autopilot 250 may be referred to herein as "modules." Modules are structural components of a system or sub-system. The functionality of a module may be implemented using hardware, software, firmware or a combination thereof.

The FMS 5 is an onboard system that controls the navigation of the aircraft 10 along the flight plan 100 and may include RTA system capability. RTA capability allows an aircraft to "self-deliver" to a specified waypoint or waypoints of a flight plan at a specified time along a four-dimensional trajectory (latitude, longitude, altitude and time). The RTA system 202 may be used within the context of a Controlled Time of Arrival system to help manage the burden on an ATC system resource. Additional information concerning the use of RTA systems in the cruise phase of a flight plan may be found in *Impacts of ATC Related Maneuvers on Meeting a Required Time of Arrival*, Paul Oswald, The MITRE Corporation, Egg Harbor, N.J. (2006) and in U.S. Pat. No. 6,507,782, which are hereby incorporated by reference in their entireties.

Typically, the flight plan 100 of the aircraft 10 is preloaded into the FMS 5 prior to departure. The FMS 5 may comprise one or more suitable processors 270 that are in operable communication with a memory device 271 and/or a database 273. The memory device may comprise any suitable memory and may contain current information of the aircraft operation or atmospheric environment. Exemplary, non-limiting memory devices may include random access memory (RAM) of any architecture, flash memory, a programmable logic device, erasable programmable read only memory (EEPROM), and the like. The database 273 may contain more static information such as engine and airframe information that does not change appreciably during a flight. Processor 270 may also be in operable communication with and receive information from a global positioning system 255, aircraft avionics sensors 260 and atmospheric sensors 265. The FMS may also comprise a video display interface 280 with which to display information on video display device 290. One of ordinary skill in the art will recognize that the processors 270, memory device 271 and database 273 and their functional equivalents each comprise a "computer readable storage medium" as the term is used herein. A computer readable storage medium is not a modulated electromagnetic signal.

In some embodiments, the FMS 5 may also receive RTA profile information from the RTA system 202 supplying course, speed and altitude change recommendations to arrive at a RTA waypoint on time. The RTA system 202 may receive positioning information from global positioning system ("GPS") 255, avionics information (such as aircraft velocity and ground speed) from avionics sensors 260, and atmospheric information from atmospheric sensors 265. In other embodiments the RTA system 202 may be integrated into the FMS 5 and may share information from the GPS 255, avionics sensors 260 and atmospheric sensors 265 with the FMS 5 over the exemplary interface 245.

Figure 4A:
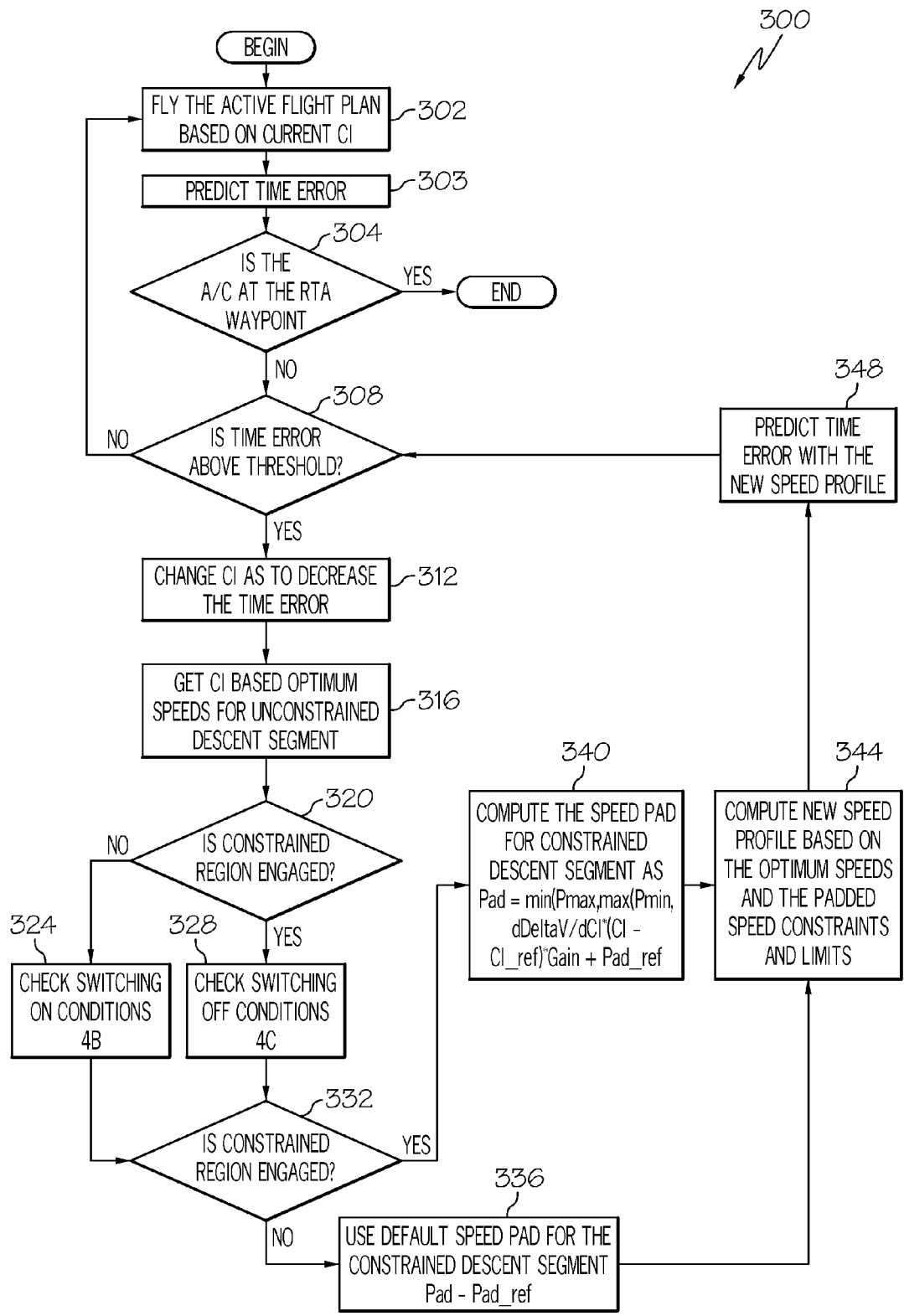
FIGS. 4A-4C is a logic flow diagram of embodiments disclosed herein.
Figure 4B:
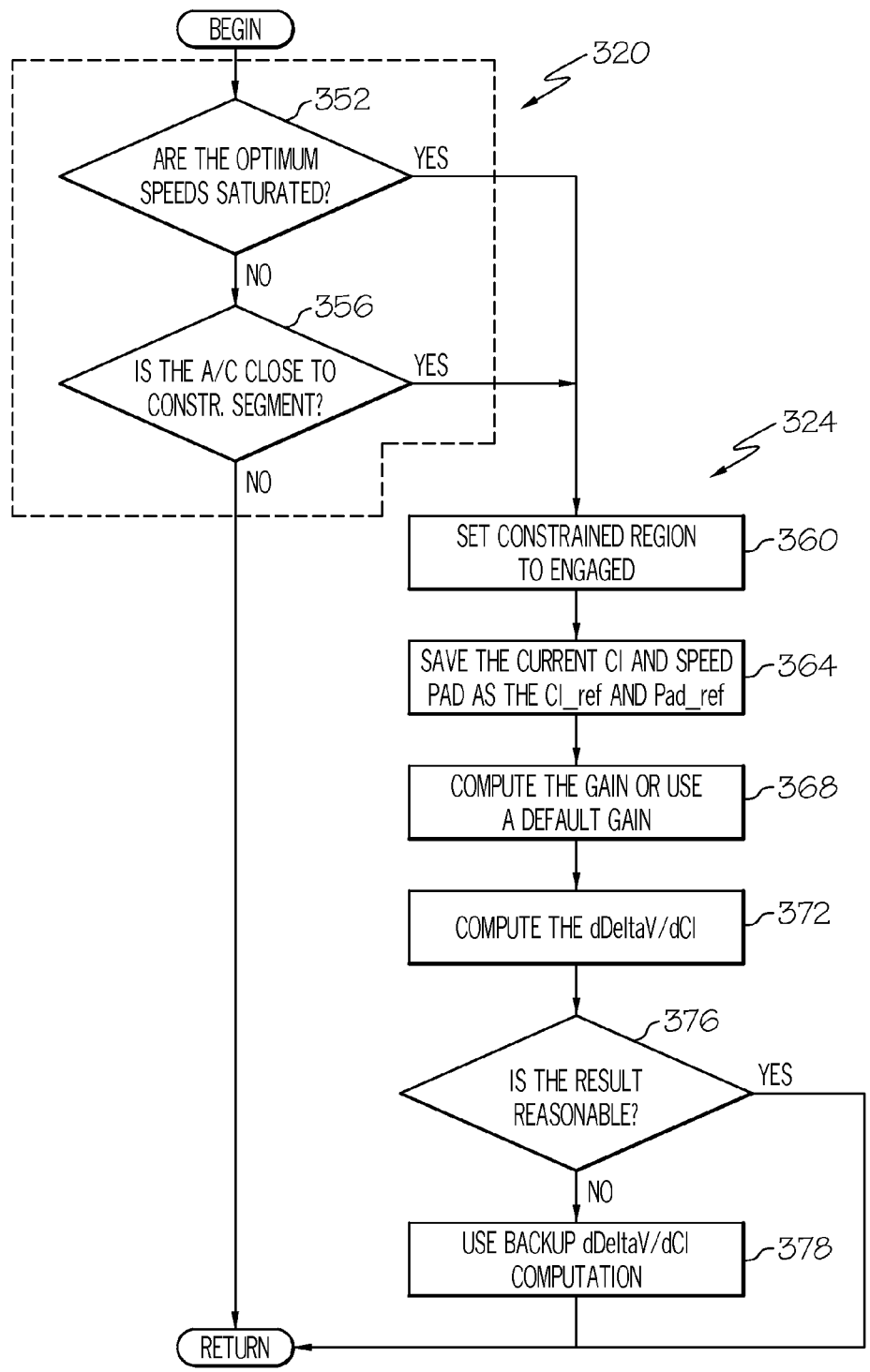
Figure 4C:
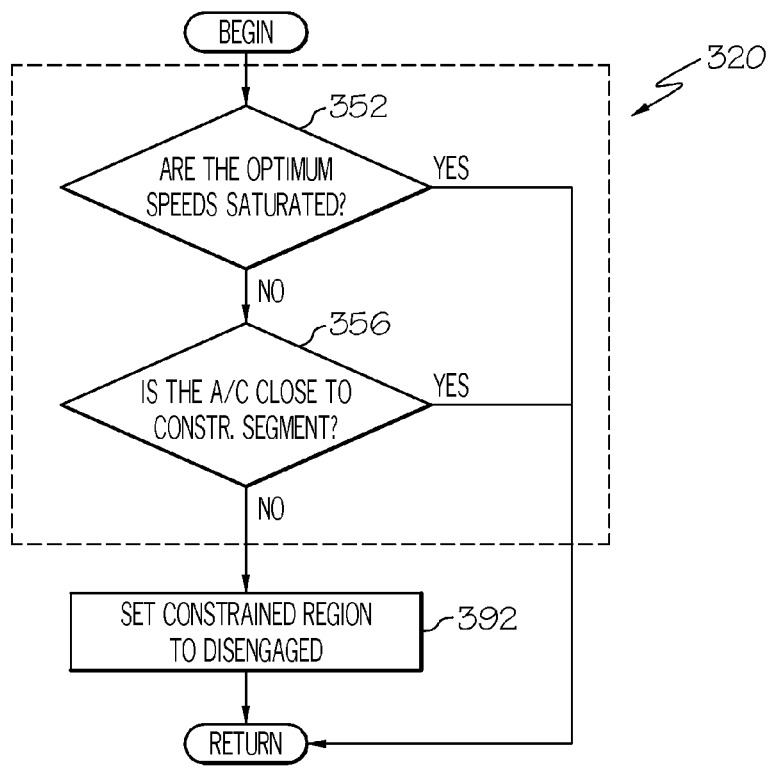

FIGS. 4A-C is a logic flow diagram of an exemplary method 300 to achieve the smoothing of RTA speed transitions across multiple flight path regions. The method begins at process 302 where the aircraft 10 is flying the active flight plan 100 based on a current cost index ("CI"). A CI is ratio based on a monetary formula that is used by the FMS system 202 to control the speed of the aircraft by evaluating the effect of one cost factor in the hopes of minimizing the sum of those factors.

To do this the FMS 5 generates the CI using information about time-related costs and fuel cost. Fuel costs are based on the price and amount of fuel needed to complete the flight (legally, with reserves etc). Most aircraft operators use a ratio of the two costs to determine the economy speed for a given flight on a given day. This ratio is called the CI, and it determines the economic speed for a flight by minimizing the total cost of operation. Although there are other factors that may be used to control the speed of an aircraft, the CI is being used here in the interest of brevity and clarity as an exemplary means of speed control and is not intended to be limiting.

At process 303 a time error is predicted by the RTA system 202. The time error is the difference between the RTA at the RTA waypoint 125 and the expected time of arrival at the RTA waypoint 125 based on the current position and air speed of the aircraft 10 along the flight plan 100.

At determination point 304, it is determined if the aircraft 10 is at the RTA waypoint 125 or not. If so, the method ends. If not, then a further determination is made as to whether or not the time error has exceeded a predetermined threshold. The predetermined threshold may be a computed threshold or may be a threshold that is stored in a memory structure such as a look-up table or the like. If the time error does not exceed the predetermined threshold, the method 300 returns to process 302. If the process does exceed the predetermined threshold, then the method proceeds to process 312.

At process 312, the FMS 5 retrieves CI based optimum speed data in process 316 from exemplary memory device 271 or exemplary database 273 (see, FIG. 3) and changes the CI to reduce the time error by increasing/decreasing the speed of aircraft 10 while traversing the preceding region 105.

At determination point 320 (see also, FIGS. 4B and 4C), a determination is made whether or not the pad 175 of the speed constrained region 110 has been engaged. Those of ordinary skill in the art will appreciate that the determination as to whether the pad 175 of the speed constrained region 110 has been engaged or not may be accomplished in any suitable manner. As a non-limiting example, whether or not the pad 175 of the speed constrained region 110 has been engaged may include determinations 352 and 356 (see also, FIG. 4B).

At determination point 352, a determination is made as to whether or not the speed pad 150 in the preceding region(s) 105 has been "saturated". By "saturated" it is meant that the speed pads of the remaining portion of the preceding region(s) 110 have been exhausted such that the aircraft is operating at its maximum speed envelope 115 in an attempt to meet the RTA at RTA waypoint 125. If speed pads of the preceding regions are saturated the method proceeds to engagement subroutine 324.

If the speed pad 150 has not been saturated, then the method may proceed to determination point 356. A further determination may be made at determination point 356 as to whether or not the aircraft 10 is in close proximity to the boundary of the speed constrained region 110. The distance or expected time until arrival defining "in close proximity" may be timely calculated or it may found in a predetermined look up table or other memory structure based on the structure and constraints of the speed constrained region 110 and may be stored in and retrieved from a database such as exemplary database 273. If the aircraft 10 is in close proximity to the speed constrained region 110, the method 300 proceeds to the engagement subroutine 324. If not, then the method 300 returns to the speed iteration loop 301.

If the pad 175 of the speed constrained region 110 is already engaged, a further determination is made as to whether or not the pad 175 should be disengaged due to changing conditions at determination point 332. For example, if the wind or other flight uncertainties have recently changed to a more favorable situation, the method 300 allows disengagement of the pad 175 if both the aircraft is distant from the speed constrained region and the speed pad 150 of the preceding region 105 is no longer saturated. One of ordinary skill in the art will appreciate that thresholds and set points may be chosen, and additional logic steps (e.g. time delays) included, to prevent flip flopping between engagement and disengagement status when flight parameters hover at or near the proximity and saturation set points.

The same is true of the converse situation where the pad 175 of the speed constrained region 110 may already be disengaged. When either the speed of the preceding region(s) 105 has become saturated or the aircraft 10 is in close proximity to the speed constrained region 110, the method 300 checks to see whether the pad 175 of the speed constrained region 110 should become engaged.

Those of ordinary skill in the art will appreciate that the term "close proximity" is relative to the speed of the aircraft and the characteristics or the surrounding geography and airspace. For simplicity and brevity, close proximity may be assumed to be predetermined distance (e.g. 50 nm) or a time until entering the speed constrained region 110 (e.g., 5 minutes).

Although the determinations comprising exemplary determination point 320 are logically arranged such that either one of determination point 352 or 356 may by itself progress the method to the engagement subroutine 324, one of ordinary skill in the art will appreciate that other determinations may be made. Determinations 352, 356 and or other determinations may be required to be made in series such that all the determinations must be fulfilled before the engagement subroutine 324 may be entered.

Returning to determination point 332, if the pad 175 of the speed constrained region 110 has not been engaged, then the method 300 proceeds to process 336. One or ordinary skill in the art will appreciate that although the determinations made at determination point 332 may be the same as those made at determination point 320, there may be different logical determinations or the determination points may logically rearranged without departing form the scope of the subject matter being disclosed herein.

At process 336, a predetermined or a pre-calculated default speed pad (Pad_ref) is used for the pad 175.

$$Pad = Pad\_ref$$

For example, the Pad_ref may be 10 knots, where the maximum speed limit is 250 knots. However, one of ordinary skill in the art will recognize that Pad_ref may be any suitable number and may be calculated or read from a memory device (not shown) that contains a suitable data structure such as a look up table.

If it is determined at determination point 332 that the pad 175 of the speed constrained region 110 has been engaged, then the method 300 proceeds to process 340. At process 340 the pad 175 of the speed constrained region 110 is dynamically determined as a function of the cost index of the flight. One of ordinary skill in the art will appreciate that the function defining the cost index may vary as may be suitable for the airframe and the flight mission without departing from the scope of this disclosure. One function may be suitable for a military mission while another function may be suitable for a passenger flight. As a non-limiting example the pad 175 of the speed constrained region 110 may be determined by the following equation, bounded by a predetermined minimum (Pmin) and a maximum (Pmax).

$$Pad = \min(Pmax, \max(Pmin, d\text{Delta } V/dCI*(CI-CI\_ref)*Gain+Pad\_ref))$$

where,
CI_ref is a predetermined reference cost index;
Pad_ref is the predetermined reference speed pad;
Delta V is the aircraft's velocity change'
CI is the cost index;
dDelta V/dCI is the rate of change of the change in velocity relative to the cost index (i.e. the slope of the optimal speed curve with respect to the CI); and Gain is a ratio of the change in the Pad 175 of the speed constrained region 110 to the change in velocity of the aircraft and which may be greater or less than 1.0.

At the completion of process 340 or 336, the method 300 proceeds to process 344 where a new speed profile for the remainder of the preceding region(s) 105 and the speed constrained region 110 is compiled by the FMS 5, RTA system 202 or other navigation system. The method 300 proceeds to process 348 where a new time error is calculated and then returns to determination point 308 to complete the Speed Iteration Loop 301.

FIG. 4B is a logic flow diagram of processes to engage the pad 175 of the constrained speed region. At the exemplary determination point 320, if one of exemplary determinations 352 or 356 is true then the method 300 proceeds to process 360 in the engagement subroutine 324.

At process 360 a logic flag is set to "yes". At subsequent process 364, the current CI and pad 175 are saved as data inputs "CI_ref" and "Pad_ref," respectively.

At process 368, the "Gain" is calculated or a default Gain is read from memory. As discussed above, the Gain is a ratio relating the change in speed of the aircraft 10 to the pad of the speed constrained region 110. The Gain may be greater or less than one. For example, if the pad 175 of the speed constrained region 110 is 10 knots and the Gain is unity, then for every one knot increase in speed, the pad 175 of the speed constrained region 110 is reduced by one knot. At process 368, d Delta V/dCI is determined by the FMS 5 or other computing device.

At decision point 376, it is determined if the result of process 376 is reasonable. As a non-limiting example, a reasonable d Delta V/dCI may be some minimum value above zero. However, those ordinary skill in the art will appreciate a determination of reasonableness may be determined in a multitude of different ways as may suit the mission of the aircraft.

After completion of engagement subroutine 324, the method 300 advances to determination point 332 and continues as described above in regard to FIG. 4A.

FIG. 4C is a logic flow chart of subroutine 328. At determination point 320, if the exemplary determinations 352 and 356 are both "no," then the logic flag discussed above in regard to FIG. 3B, is set to disengaged. Otherwise the method 300 loops back to determination point 320.

Figure 5:
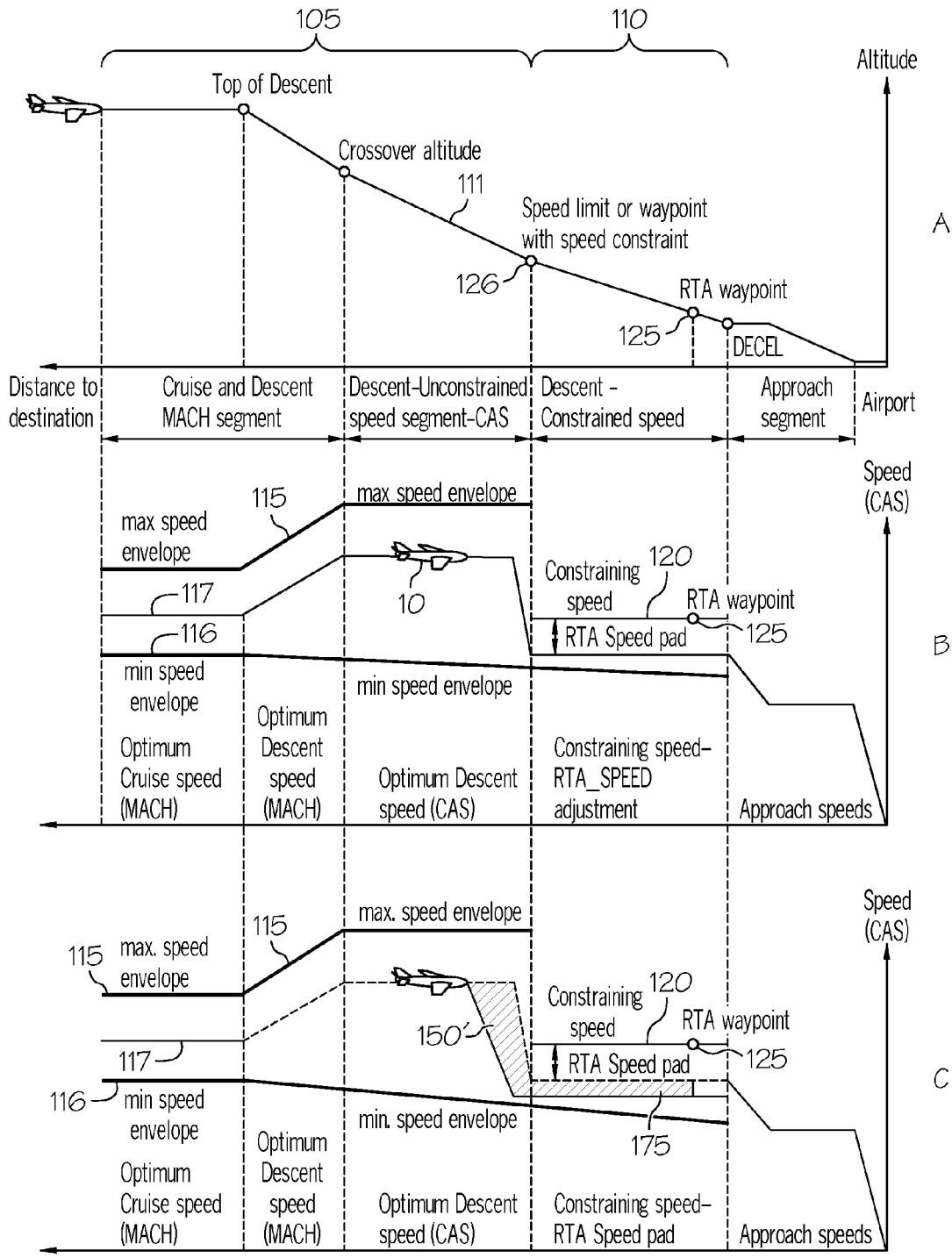
FIG. 5 is an illustration of the descent phase of an exemplary flight plan where the aircraft is ahead of schedule.

FIG. 5 illustrates an exemplary situation in which the aircraft is traversing the flight plan 100 and is ahead of schedule. Profile "A" is the altitude profile 111 of the flight plan 100 and contains an exemplary RTA waypoint 125. Profile "B" is a speed profile showing a maximum speed envelope 115, a minimum speed envelope 116 and the planned speed envelope 117. The maximum speed envelope 115 may be the maximum rated speed of the aircraft 10 at a particular altitude. The minimum speed envelope may be the minimum stall speed of the aircraft 10. In the speed constrained region 110, profile B also indicates the constrained speed limit 120. The difference between planned speed envelope 117 and the constrained speed limit is the pad of the speed constrained region.

The crosshatched areas of profile "C" indicate the speed pad for each region in the flight plan. For the sake of clarity and brevity, the pad is again the difference between the maximum speed envelope 115 and the planned sped profile unifier for the preceding region(s) 105. The pad 175 for the speed constrained region 110 is again assumed to be 10 knots with a constraining speed limit 120 of 250 knots.

Speed profile "C" of FIG. 5 depicts the aircraft 10 has having traveled most of the preceding region(s) 105 but is ahead of schedule. In order to meet the RTA at RTA waypoint 125, the aircraft 10 will need to decelerate to the extent of its minimum speed envelope 116 of the preceding region 105. However, the speed pad 150' (the difference between the planned speed envelope 117 and the minimum speed envelope 116) remaining in the preceding region 105 is insufficient to achieve the RTA at RTA waypoint 125. As a further solution, the speed that will need to be used in the speed constrained region 110 will necessarily have to decrease, thereby increasing the pad 175 of the speed constrained region 110.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for creating a smooth speed profile while meeting a required time of arrival (RTA) for an aircraft in a multi-segmented flight plan including a preceding region with a first predetermined speed pad and a speed constrained region with a second predetermined speed pad, comprising steps of:
    determining whether the second predetermined speed pad is engaged based at least in part on a proximity of the aircraft to the speed constrained region;
    if the second predetermined speed pad is engaged, determining a revised second speed pad for the speed constrained region;
    if the second predetermined speed pad is not engaged, then assigning a default speed pad as the second predetermined speed pad for the speed constrained region;
    compiling a new speed profile that is defined based on one of the revised second speed pad and the default speed pad for the speed constrained region; and
    causing the aircraft speed to conform to the new speed profile.

2. The method of claim 1, wherein the second predetermined speed pad is at least partially determined by a cost index (CI).

3. The method of claim 1, further including determining whether a time error between an RTA at a waypoint and a predicted arrival time at the waypoint exceeds a predetermined threshold while traversing the preceding region.

4. The method of claim 3, further comprising accelerating to the new aircraft speed while the aircraft is traversing the preceding region to decrease the time error to below the predetermined threshold if the time error exceeds the predetermined threshold.

5. The method of claim 1, wherein the second predetermined speed pad is disengaged when the new aircraft speed does not saturate a speed pad of the preceding regions and the aircraft is not located in close proximity to the speed constrained region.

6. The method of claim 1, wherein the second predetermined speed pad is engaged when the new aircraft speed saturates a speed pad of the preceding regions.

7. The method of claim 1, wherein the second predetermined speed pad is engaged based at least in part on a new aircraft speed.

8. The method of claim 1, further comprising determining the revised second speed pad as a constrained function of a differential cost index, a gain multiplier and, a reference pad.

9. The method of claim 1, wherein the revised second speed pad is the second predetermined speed pad plus or minus a fraction of a difference between the new speed profile and a speed profile of the preceding region.

10. The method of claim 1, wherein the revised second speed pad is determined by a relationship of:

$$Pad = d\text{Delta } V/dCI * (CI - CI\_ref) * Gain + Pad\_ref.$$

11. An apparatus for smoothing a required time of arrival (RTA) speed transition for an aircraft in a multi-segmented speed profile, comprising:
    a first module, the first module configured to:
        determine whether a speed pad of the speed constrained region is engaged based on the speed of the aircraft and whether or not the aircraft is located in close proximity to the speed constrained region,
        determine a value for the speed pad for the speed constrained region if the speed constrained region is engaged,
        assign a default speed pad as the speed pad for the speed constrained region if the speed constrained region is not engaged,
        compile a new multi-segmented speed profile that is defined by one of the speed pad and the default speed pad for the speed constrained region, and
    a second module, the second module configured to cause the aircraft to comply with the new speed profile.

12. The apparatus of claim 11 wherein the speed pad is engaged when the new aircraft speed saturates a speed pad of the preceding regions.

13. A computer readable storage medium that is adapted to contain instructions thereon that when executed performs the steps of:
    determining whether a speed constrained region is engaged by a preceding region based on a speed of an aircraft and whether or not the aircraft is located in close proximity to the speed constrained region;
    if the speed constrained region is engaged, determining a speed pad value for the speed constrained region;
    if the speed constrained region is not engaged then assigning a default speed pad as the speed pad for the speed constrained region;
    compiling a new speed profile that is defined by one of the speed pad value and the default speed pad for the speed constrained region; and
    transmitting commands that cause the aircraft to conform to the new speed profile.

14. The computer readable storage medium of claim 13, further comprising the steps of determining a time error between a required time of arrival (RTA) at an RTA waypoint.

15. The computer readable storage medium of claim 14, further comprising the steps of determining whether the time error is above a predetermined threshold value.

16. The computer readable storage medium of claim 15, further comprising the steps of
    determining whether the aircraft is distant from the speed constrained region.

17. The computer readable storage medium of claim 16 further comprising the steps of determining whether a speed pad of a preceding region is not saturated.

18. The computer readable storage medium of claim 17 further comprising the steps of disengaging the speed constrained region when the aircraft is distant from the speed constrained region and the speed pad of a preceding region is not saturated.

19. The computer readable storage medium of claim 17 further comprising the steps of engaging the speed constrained region when one of the aircraft is distant from the speed constrained region and the speed pad of a preceding region is not saturated.

20. The computer readable storage medium of claim 19 further comprising the steps of setting a computer indication that the speed constrained region is engaged;

saving a current CI and a current speed pad of the speed constrained region to memory as a reference CI value and a reference pad values;

compute a gain proportional to a first change in the speed of the aircraft in the preceding region to a second change in a pad of the speed constrained region.

* * * * *